(12) United States Patent
Dierks et al.

(10) Patent No.: US 8,662,525 B1
(45) Date of Patent: Mar. 4, 2014

(54) ADJUSTABLE WIDTH TRAILER

(71) Applicants: Dale J. Dierks, Mitchell, SD (US);
Patrick A. Geraets, Mitchell, SD (US)

(72) Inventors: Dale J. Dierks, Mitchell, SD (US);
Patrick A. Geraets, Mitchell, SD (US)

(73) Assignee: Dakota Manufacturing Company, Inc., Mitchell, SD (US)

( * ) Notice: Subject to any disclaimer, the term of this patent is extended or adjusted under 35 U.S.C. 154(b) by 0 days.

(21) Appl. No.: 13/839,143

(22) Filed: Mar. 15, 2013

(51) Int. Cl.
*B62B 1/00* (2006.01)

(52) U.S. Cl.
CPC .......................................... *B62B 1/00* (2013.01)
USPC ............................ 280/656; 280/789; 280/142

(58) Field of Classification Search
CPC ............ B62B 1/00; B62B 21/14; B62B 21/20
USPC ............ 280/656, 789, 142, 401, 441.2, 415.1
See application file for complete search history.

(56) References Cited

U.S. PATENT DOCUMENTS

| | | | | |
|---|---|---|---|---|
| 3,245,714 | A * | 4/1966 | Blair | 296/26.13 |
| 3,330,574 | A * | 7/1967 | Kulyk | 280/656 |
| 3,697,098 | A * | 10/1972 | Fisher | 280/415.1 |
| 4,119,224 | A | 10/1978 | Moody | |
| 4,358,133 | A | 11/1982 | Stucky | |
| 4,570,967 | A * | 2/1986 | Allnutt | 280/656 |
| 5,154,469 | A * | 10/1992 | Morrow | 296/26.02 |
| 6,102,370 | A | 8/2000 | Johnston | |
| 6,290,450 | B1 * | 9/2001 | Humphries et al. | 414/563 |
| 6,527,495 | B2 * | 3/2003 | Humphries et al. | 280/656 |
| 7,278,650 | B2 * | 10/2007 | Brady et al. | 280/441.2 |
| 7,287,947 | B2 * | 10/2007 | Smith | 280/441.2 |
| 8,152,200 | B2 | 4/2012 | Murray et al. | |

* cited by examiner

*Primary Examiner* — Hau Phan
(74) *Attorney, Agent, or Firm* — Dennis L. Thomte; Thomte Patent Law Office LLC (57) ABSTRACT

An adjustable width trailer is disclosed which is capable of hauling large machines, farm machinery, or the like. The trailer includes one or more pull-out extender assemblies mounted on the frame of the trailer. Each of the pull-out extender assemblies includes a plurality of horizontally disposed and horizontally spaced-apart support tubes which are secured to the frame of the trailer in a transverse relationship thereto so that the outer ends of the support tubes are positioned outwardly of the frame members of the frame of the trailer. Each of the pull-out extender assemblies includes first and second pull-out sections at one side of the trailer and third and fourth pull-out sections at the other side of the trailer which are individually movable between retraced and extended positions.

6 Claims, 8 Drawing Sheets

ADJUSTABLE WIDTH TRAILER

BACKGROUND OF THE INVENTION

1. Field of the Invention

This invention relates to an adjustable width trailer for transporting large machines, large farm machinery, etc. More particularly, this invention relates to a trailer having selectively retractable and extendable pull-out extender assemblies at each side thereof which may be extended when transporting large machines or farm machinery and which may be retracted when the trailer is not transporting the same.

2. Description of the Related Art

Adjustable width trailers are commonly used to transport large machines or farm machinery such as combines or the like. Usually, the adjustable width trailers of the prior art have a plurality of pull-out sections positioned on opposite sides of the trailer. A typical prior art pull-out section includes a plurality of spaced-apart and transversely extending tubes or tubular members which are slidably mounted in transversely extending support tubes affixed to the frame of the trailer. The outer ends of the tubular members of the pull-out section are interconnected by a cross-member beam or cap. The pull-out section of the prior art is manually movable between retracted and extended positions. The fact that there are normally several tubular members used in the pull-out section, the weight thereof makes it difficult to manually move the pull-out section between retracted and extended positions and vice versa.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An adjustable width trailer is disclosed which includes an elongated wheeled frame means, having a forward end, a rearward end, a first side and a second side. The frame means includes horizontally spaced-apart first and second elongated frame members. A plurality of horizontally spaced-apart cross-frame members are secured to the first and second frame members and extend therebetween. A first pull-out extender assembly is secured to the frame means rearwardly of the forward end thereof. In the preferred embodiment, a second pull-out extender assembly is secured to the frame means rearwardly of the first pull-out extender assembly.

The first pull-out extender assembly includes a mounting structure having a plurality of elongated support tubes, having first and second ends, secured to the first and second frame members in a transverse relationship thereto so that the first ends of the support tubes are positioned laterally outwardly of the first frame member and so that the second ends of the support tubes are positioned outwardly of the second frame member. The support tubes include a forward support tube, a rearward support tube, and at least first and second intermediate support tubes positioned between the forward support tube and the rearward support tube.

The first pull-out extender assembly includes a first pull-out section having horizontally spaced-apart forward and rearward tubular members, having inner and outer ends, the inner ends of which are selectively slidably received by the first ends of the forward support tube and the rearward support tube respectively so as to be movable between retracted and extended positions with respect to the mounting structure, and an elongated beam secured to and extending between the outer ends of the forward tubular member and the rearward tubular member of the first pull-out section. The first pull-out extender assembly also includes a second pull-out section including at least first and second tubular members, having inner and outer ends, with a beam secured to the outer ends of the first and second tubular members of the second pull-out section. The inner ends of the first and second tubular members of the second pull-out section are slidably received by the outer ends of the intermediate support tubes so as to be selectively movable between retracted and extended positions with respect to the mounting structure. Third and fourth pull-out sections, which are identical to the first and second pull-out sections respectively, are operatively mounted on the second ends of the support tubes. The second pull-out extender assembly is spaced rearwardly of the first pull-out extender assembly and is identical to the first pull-out extender assembly.

Any number of the pull-out extender assemblies may be utilized. Further, any number of the tubular members of the second pull-out section may be utilized.

It is therefore a principal object of the invention to provide a trailer including pull-out extender assemblies which are comprised of first and second pull-out sections which are individually moved between extended and retracted positions.

A further object of the invention is to provide a trailer having extender assemblies at each side thereof with the extender assemblies being easily moved between retracted and extended positions.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
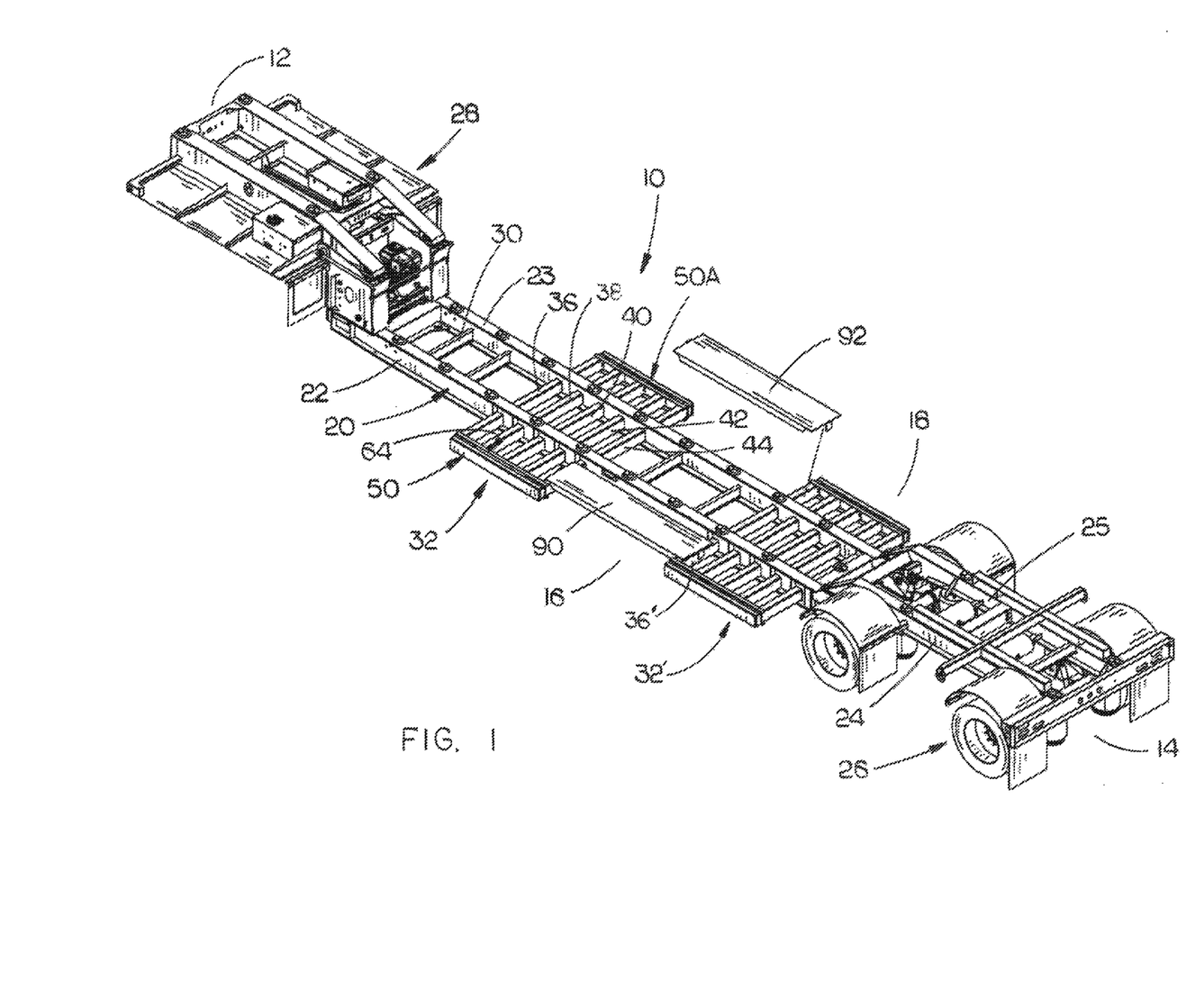
FIG. 1 is a rear perspective view of the trailer of this invention with the pull-out extender assemblies thereof being in a retracted position.

The numeral 10 refers to the trailer of this invention which has a forward end 12, a rearward end 14, a first side 16 and a second side 18. Trailer 10 includes a main frame 20 having longitudinally extending frame members 22 and 23. The rearward ends of frame members 22 and 23 have elevated frame portions 24 and 25 which have a running gear 26 secured thereto. The forward ends of frame members 22 and 23 have a conventional goose-neck hitch structure 28 which is preferably detachably secured to the forward ends of frame members 22 and 23. Hitch structure 28 is designed to be attached to a prime mover such as a truck or the like. A plurality of spaced-apart cross-members 30 are secured to frame members 22 and 23 and extend therebetween as seen in FIG. 1.

Trailer 10 includes a pair of identical pull-out extender assemblies 32 and 32'. Inasmuch as assemblies 32 and 32' are identical, only assembly 32 will be described in detail with "'" indicating identical structure on assembly 32'. Although a pair of assemblies 32 and 32' are illustrated, the trailer could have additional pull-out assemblies if so desired.

Figure 8:
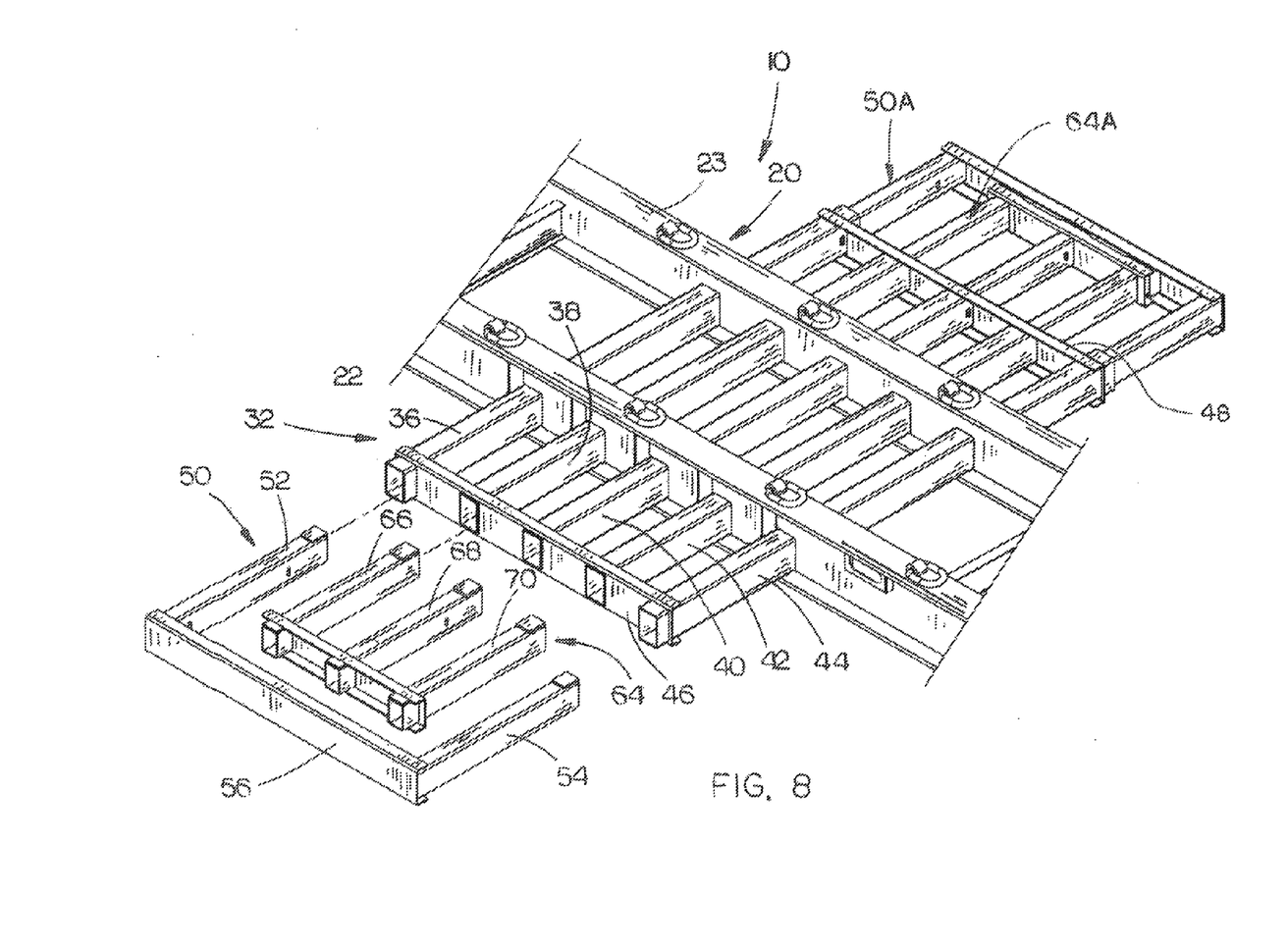
FIG. 8 is a partial rear exploded perspective view of the trailer of this invention.

Assembly 32 includes elongated support tubes 36, 38, 40, 42 and 44 which are secured to frame members 22 and 23 and which extend therebetween with the opposite outer ends thereof being disposed outwardly of frame members 22 and 23 respectively. A cap or beam 46 is secured to one end of the support tubes 36, 38, 40, 42 and 44 and a cap or beam 48 is secured to the other ends of support tubes 36, 38, 40, 42 and 44. As seen in FIG. 8, the outer ends of support tubes 36 and 44 are positioned outwardly of beams 46 and 48 respectively.

Figure 9:
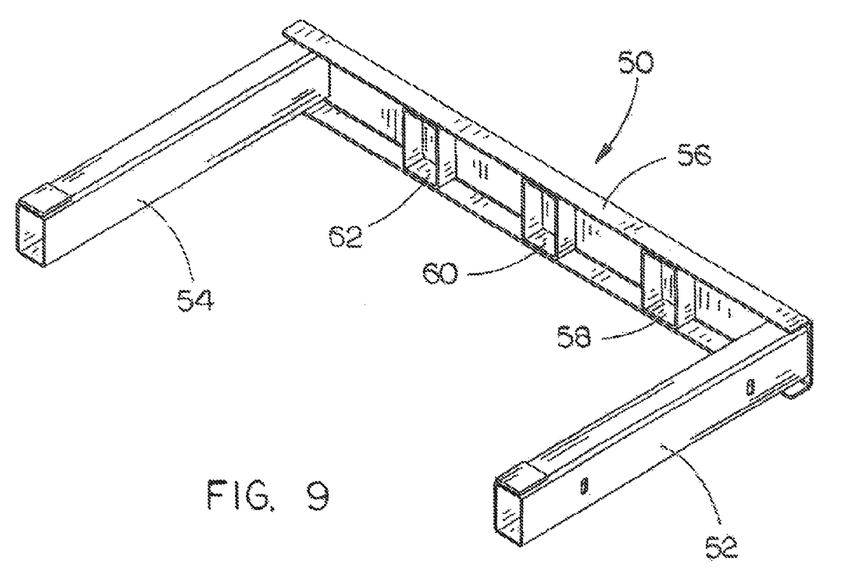
FIG. 9 is a perspective view of one of the first pull-out sections of the trailer of this invention.

The numeral 50 refers to a pull-out section which includes tubular members 52 and 54 which are selectively slidably received in one end of support tubes 36 and 44 respectively. Pull-out section 50 is slidably movable between retracted and extended positions with respect to support tubes 36 and 44. The outer ends of tubular members 52 and 54 have a cross-member or beam 56 secured thereto which extends therebetween. The inner side of beam 56 has pockets 58, 60 and 62 secured thereto, as seen in FIG. 9.

Figure 10:
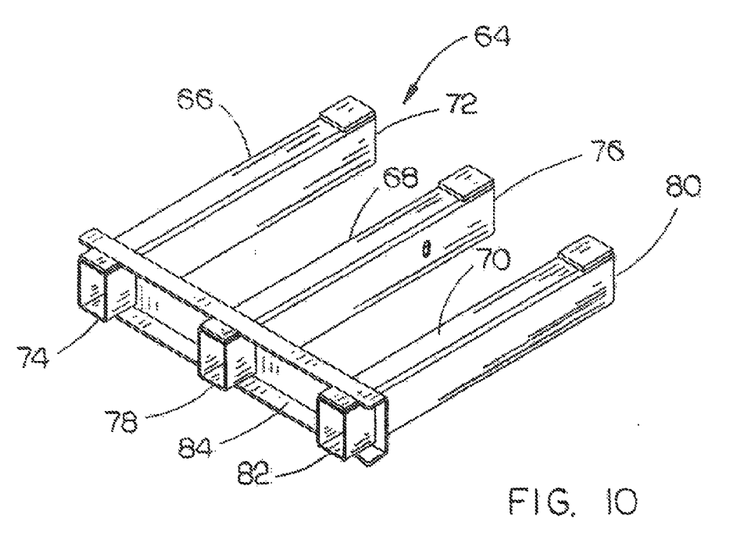
FIG. 10 is a perspective view of one of the second pull-out sections of the trailer of this invention.

The numeral 64 refers to a pull-out section which includes three spaced-apart tubular members 66, 68 and 70. Tubular member 66 has an inner end 72 and an outer end 74. Tubular member 68 has an inner end 76 and an outer end 78. Tubular member 70 has an inner end 80 and an outer end 82. A cross-member or beam 84 is secured to tubular members 66, 68 and 70 inwardly of the outer ends thereof so that the outer ends thereof protrude outwardly from beam 84, as seen in FIG. 10.

As seen, the inner ends of tubular members 66, 68 and 70 are selectively slidably received within one end of support tubes 38, 40 and 42 respectively. Pull-out section 64 is slidably movable between retracted and extended positions with respect to pull-out section 50.

A latching device 86 selectively latches pull-out section 50 in its retracted and extended positions. Latching device 86 includes a retractable pin which pins support tube 44 and tubular member 54 of pull-out section 50 together. A latching device 88 selectively latches pull-out section 64 in its extended and retracted positions. Latching device 88 includes a retractable pin which pins support tube 40 and tubular member 68 of pull-out section 64 together. A latching device (not shown) pins support tube 36 and tubular member 52 of pull-out section 50 together.

When pull-out sections 50 and 64 are in their retracted positions, beam 84 will be closely positioned adjacent to the outer side of beam 46 and beam 56 will be closely positioned adjacent to the outer side of beam 84. When the pull-out sections 50 and 64 are in their extended positions, the outer ends 74, 78 and 82 of tubular members 66, 68 and 70 respectively will be received within the pockets 58, 60 and 62 respectively.

A pull-out section 50A, identical to pull-out section 50, is slidably secured to the other ends of support tubes 36 and 44 and a pull-out section 64A is slidably secured to the other ends of support tubes 38, 40 and 42. Since pull-out sections 50A and 64A are identical to pull-out sections 50 and 64, they will not be described in detail with "A" indicating identical structure thereon.

It should be noted that the pull-out sections 64 and 64A could have a different number of tubular members associated therewith other than the three tubular members 66, 68 and 70. In other words, there could be two tubular members secured to the beam 84 or there could be as many as four, five or six tubular members. In that situation, the number of support tubes which are secured to the frame members 22 and 23 would correspond to the number of tubular members incorporated into the second pull-out section 64 or 64A.

The numerals 90 and 92 refer to elongated deck members which may be used when the assemblies 32 and 32' are in their retracted positions as well as when they are in their extended positions. When the assemblies 32 and 32' are in their retracted positions, as seen in FIG. 1, deck member 90 is supported on and extends between one end of support tube 44 and one end of support tube 36' and deck member 92 is supported on and extends between the other end of support tube 44 and the other end of tubular member 36'.

Figure 2:
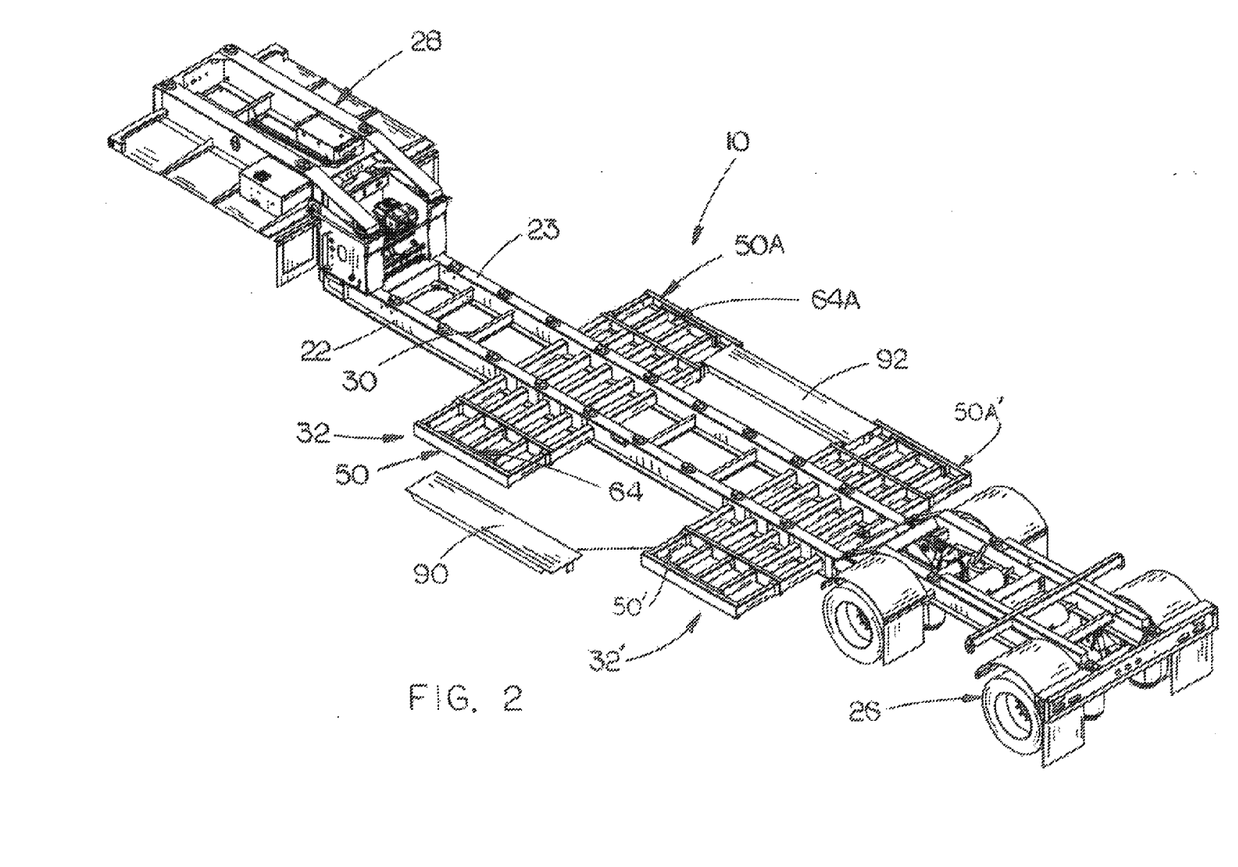
FIG. 2 is a rear perspective view of the trailer of this invention with the pull-out extender assemblies thereof being in an extended position.
Figure 3:
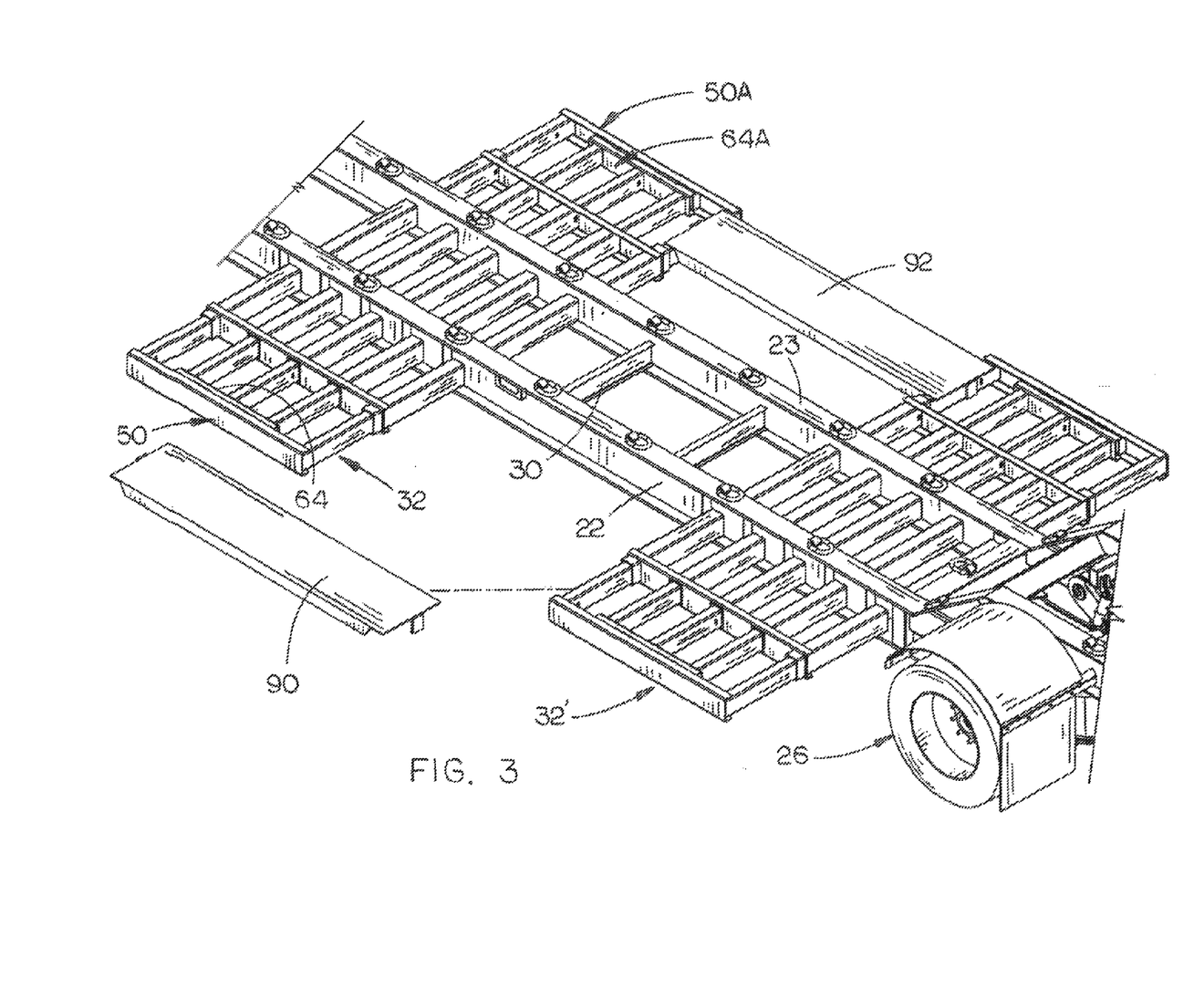
FIG. 3 is a partial rear perspective view of the trailer of this invention with the pull-out extender assemblies thereof being in an extended position.
Figure 4:
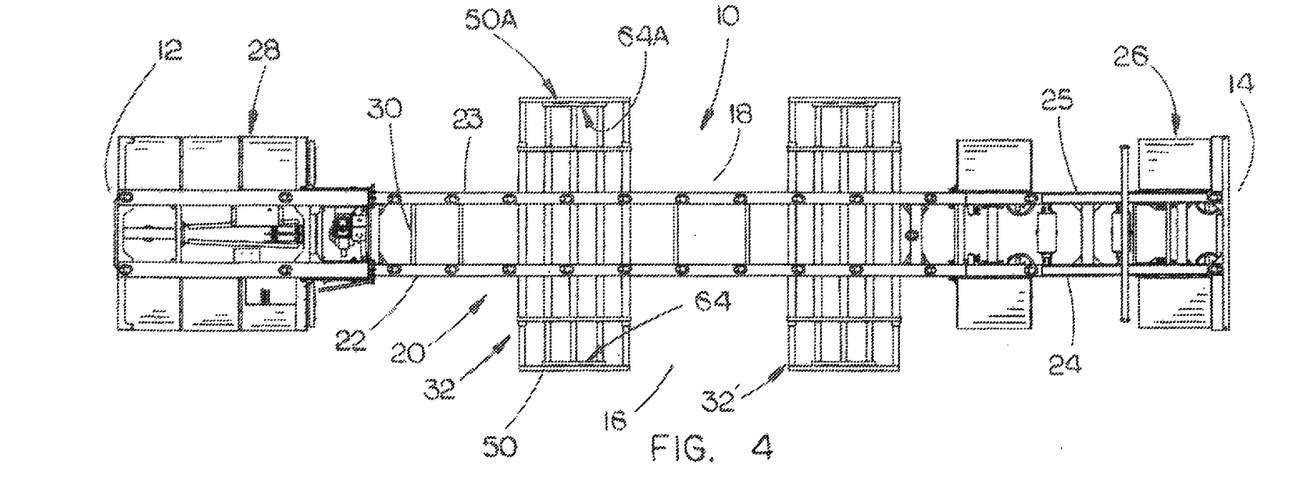
FIG. 4 is a top view of the trailer of this invention with the pull-out extender assemblies thereof being in an extended position.
Figure 5:
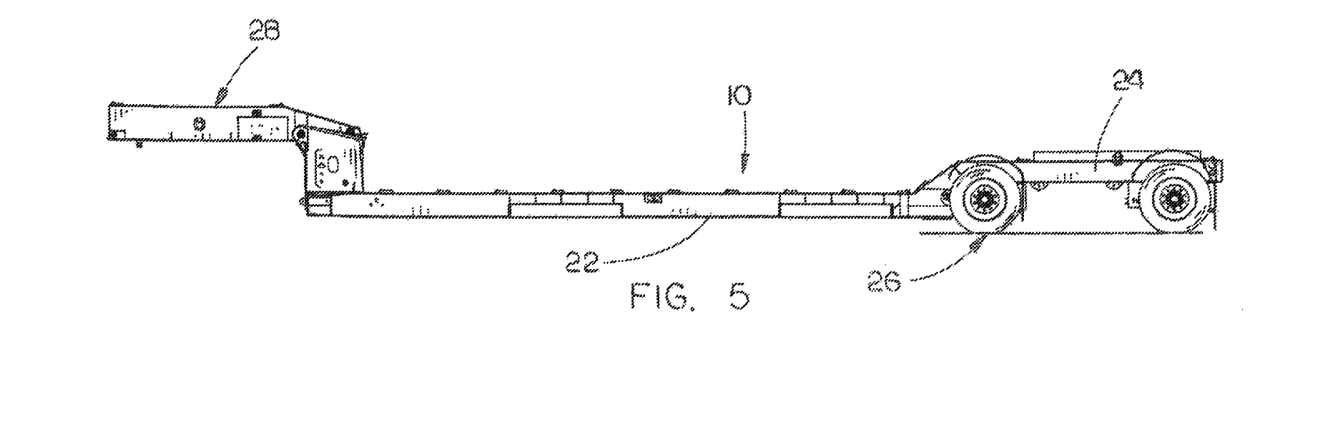
FIG. 5 is a side view of the trailer of FIG. 4.
Figure 6:
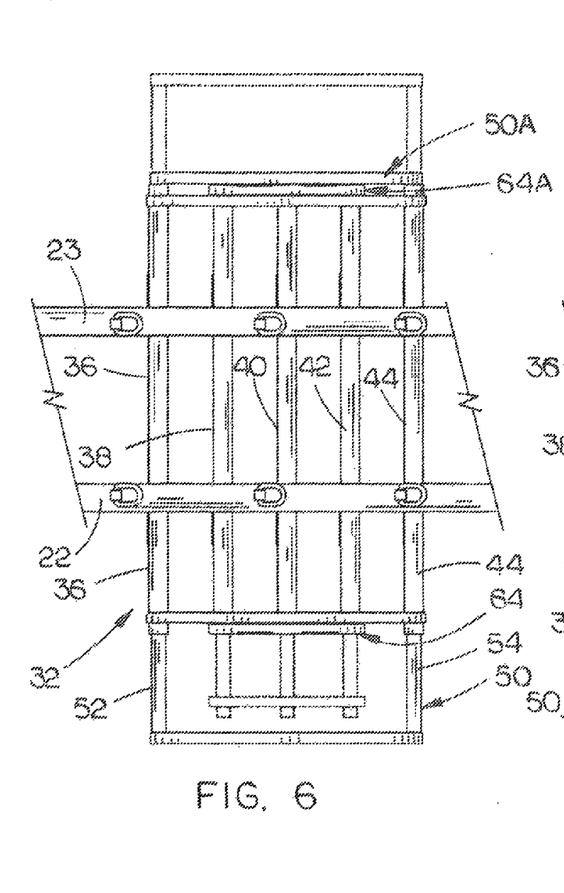
FIG. 6 is a partial top view of the trailer of this invention.
Figure 7:
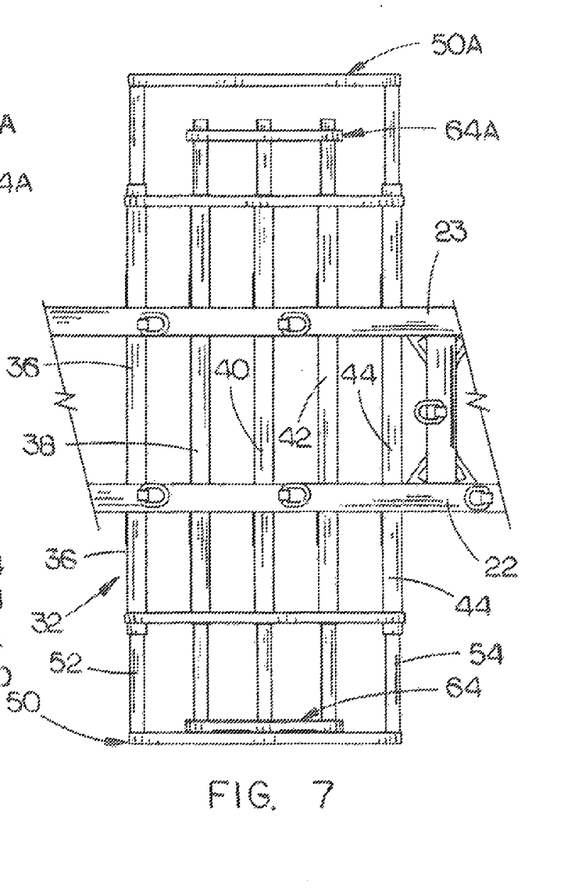
FIG. 7 is a partial top view of the trailer of this invention.

When the pull-out extender assemblies 32 and 32' are in their extended positions, as seen in FIG. 2, deck member 90 will be supported on and will extend between pull-out section 50 of assembly 32 and pull-out section 50' of pull-out section 32' with deck member 92 being supported on and extending between pull-out section 50A of assembly 32 and pull-out section 50A' of assembly 32'.

FIG. 1 illustrates the trailer 10 with the pull-out extender assemblies 32 and 32' in their retracted position. In such a position, the trailer 10 may be used to haul smaller loads or to be pulled to a location where it will be loaded with a large machine or large farm machinery such as a combine or the like. In such cases, the trailer will not have any decking thereon such as shown in the drawings. In other cases, decking may be utilized. In the position of FIG. 1, the latching devices will maintain the pull-out sections in their retracted positions.

Figure 11:
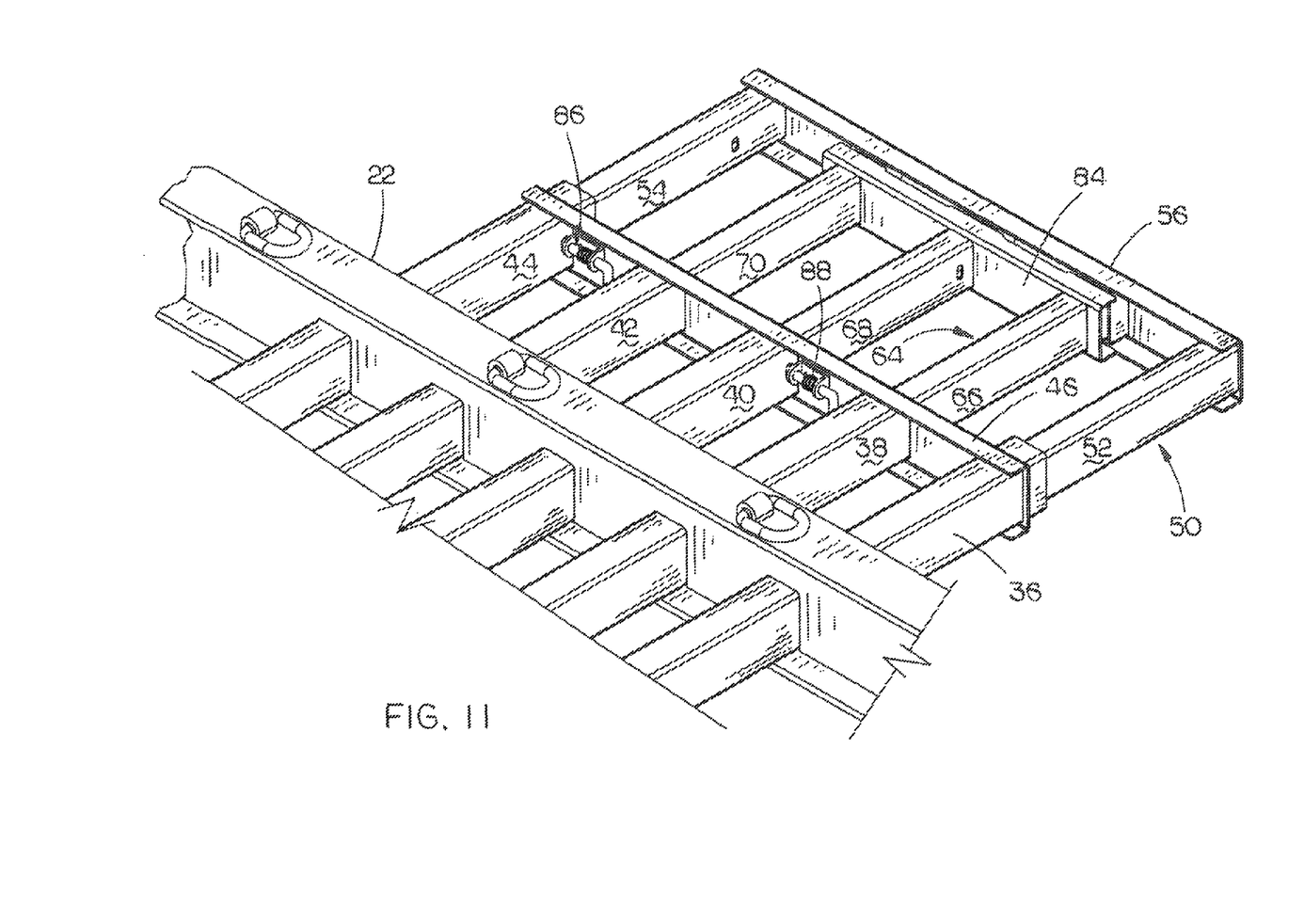
FIG. 11 is a partial front perspective view of one of the pull-out extender assemblies of the trailer of this invention in its extended position.

When it is desired to haul a large piece of equipment, the latching device 86 will be unlatched. Pull-out section 50 is then manually pulled outwardly from the end of support tubes 36 and 34. During the extension of pull-out section 50, the pull-out section 64 remains in its retracted position which enables a person to perform the extension process in a relatively effortless manner since pull-out section 64 is not being pulled outwardly with pull-out section 64. When pull-out section 50 is in its extended position of FIG. 11, the latching device 86 will be locked to maintain pull-out section 50 in its extended position. The latching device 88, if not already unlatched, will be unlatched. Pull-out section 64 is then slidably moved from its retracted position of FIG. 1 to its extended position of FIG. 11. When pull-out section 64 is in its extended position, the outer ends 74, 78 and 82 of tubular members 66, 68 and 70 respectively will be received within the pockets 58, 60 and 62. The latching device 88 is then locked to maintain pull-out section 64 in its extended position. Pull-out sections 50A and 64A are then moved from their retracted positions to their extended positions. This process is repeated for all the pull-out extender assemblies. The deck members 90 and 92 are then placed in position as seen in FIG. 2.

The trailer 10 may have a pair of the pull-out extender assemblies 32 and 32' or several pull-out extender assemblies.

The goose-neck hitch structure 28 will then be detached from the trailer frame so that the large piece of equipment, machine or farm machinery may be loaded onto the trailer from the forward end thereof.

Thus it can be seen than an adjustable width trailer has been provided wherein the pull-out sections of the pull-out extender assemblies are easily moved between their retracted and extended positions and vice versa.

Although the terms tubes and tubular members are used in the abo description, other structure members could be substituted for the tubes or tubular members.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. An adjustable width trailer, comprising:
   an elongated wheeled frame means having a forward end, a rearward end, a first side and a second side;
   said frame means horizontally including spaced-apart first and second elongated frame members;
   a plurality of horizontally spaced-apart cross-frame members secured to said first and second frame members which extend therebetween;
   a first pull-out extender assembly secured to said frame means rearwardly of the forward end thereof;
   a second pull-out extender assembly secured to said frame means rearwardly of said first pull-out extender assembly;
   said first pull-out extender assembly including a mounting structure having first, second, third, fourth and fifth elongated support tubes, having first and second ends, secured to said first and second frame members in a transverse relationship thereto so that said first ends of said first, second, third, fourth and fifth support tubes are positioned laterally outwardly of said first frame member and so that said second ends of said first, second, third, fourth and fifth support tubes are positioned outwardly of said second frame member;
   said first pull-out extender assembly including a first pull-out section having horizontally spaced-apart first and second tubular members, having inner and outer ends, the inner ends of which are selectively slidably received by said first ends of said first and fifth support tubes respectively so as to be movable between retracted and extended positions with respect to said mounting structure, and an elongated beam secured to and extending between said outer ends of said first and second tubular members of said first pull-out section;
   said first pull-out extender assembly also including a second pull-out section having horizontally spaced-apart first, second and third tubular members, having inner and outer ends, and an elongated beam secured to said outer ends of said first, second and third tubular members of said pull-out section;
   said inner ends of said first, second and third tubular members of said second pull-out section being selectively slidably received by said first ends of said second, third and fourth support tubes and which are movable between retracted and extended positions with respect thereto;
   and third and fourth pull-out sections, which are identical to said first and second pull-out sections respectively, operatively mounted on said second ends of said support tubes;
   said second pull-out extender assembly being identical to said first pull-out extender assembly.

2. The trailer of claim 1 wherein a first elongated deck member is selectively removably supported on said second tubular member of said first pull-out section of said first pull-out extender assembly at said first side of said frame means and the first tubular member of the first pull-out section of the second pull-out extender assembly at said first side of said frame means, when said first pull-out sections are in said extended position, and wherein a second elongated deck member is selectively supported upon the second tubular member of the first pull-out section of the first pull-out extender assembly at said second side of said frame means and the first tubular member of the first pull-out section of the second pull-out extender assembly at said second side of said frame means when said first pull-out sections thereof are in said extended position.

3. An adjustable width trailer, comprising:
   an elongated wheeled frame means having a forward end, a rearward end, a first side and a second side;
   said frame means horizontally including spaced-apart first and second elongated frame members;
   a plurality of horizontally spaced-apart cross-frame members secured to said first and second frame members which extend therebetween;
   a first pull-out extender assembly secured to said frame means rearwardly of the forward end thereof;
   a second pull-out extender assembly secured to said frame means rearwardly of said first pull-out extender assembly;
   said first pull-out extender assembly including a mounting structure having first, second, third and fourth elongated support tubes, having first and second ends, secured to said first and second frame members in a transverse relationship thereto so that said first ends of said first, second, third and fourth support tubes are positioned laterally outwardly of said first frame member and so that said second ends of said first, second, third and fourth support tubes are positioned outwardly of said second frame member;
   said first pull-out extender assembly including a first pull-out section having spaced-apart first and second tubular members, having inner and outer ends, the inner ends of which are selectively slidably received by said first ends of said first and fourth support tubes respectively so as to be movable between retracted and extended positions with respect to said mounting structure, and an elongated beam secured to and extending between said outer ends of said first and second tubular members of said first pull-out section;

said first pull-out extender assembly also including a second pull-out section having horizontally spaced-apart first and second tubular members, having inner and outer ends, and an elongated beam secured to said outer ends of said first and second tubular members of said second pull-out section;

said inner ends of said first and second tubular members of said second pull-out sections being selectively slidably received by said first ends of said second and third support tubes and which are movable between retracted and extended positions with respect thereto; and third and fourth pull-out sections, which are identical to said first and second pull-out sections respectively operatively mounted on said second ends of said mounting structure;

said second pull-out extender assembly being spaced rearwardly of said first pull-out extender assembly and being identical to said first pull-out extender assembly.

4. The trailer of claim 3 wherein a first elongated deck member is selectively removably supported on said second tubular member of said first pull-out section of said first pull-out extender assembly at said first side of said frame means and the first tubular member of the first pull-out section of the second pull-out extender assembly at said first side of said frame means, when said first pull-out sections are in said extended position, and wherein a second elongated deck member is selectively supported upon the second tubular member of the first pull-out section of the first pull-out extender assembly at said second side of said frame means and the first tubular member of the first pull-out section of the second pull-out extender assembly at said second side of said frame means when said first pull-out sections thereof are in said extended position.

5. An adjustable width trailer, comprising:
an elongated wheeled frame means having a forward end, a rearward end, a first side and a second side;
said frame means including horizontally spaced-apart first and second elongated frame members;
a plurality of horizontally spaced-apart cross-frame members secured to said first and second frame members which extend therebetween;
a first pull-out extender assembly secured to said frame means rearwardly of the forward end thereof;
a second pull-out extender assembly secured to said frame means rearwardly of said first pull-out extender assembly;
said first pull-out extender assembly including a mounting structure having a plurality of elongated support tubes, having first and second ends, secured to said first and second frame members in a transverse relationship thereto so that said first ends of said plurality of support tubes are positioned laterally outwardly of said first frame member and so that said second ends of said plurality of said support tubes are positioned outwardly of said second frame member;
said plurality of said support tubes including a forward support tube, a rearward support tube, and at least first and second intermediate support tubes positioned between said forward support tube and said rearward support tube;
said first pull-out extender assembly including a first pull-out section having horizontally spaced-apart forward and rearward tubular members, having inner and outer ends, the inner ends of which are selectively slidably received by the first ends of said forward support tube and said rearward support tube respectively so as to be movable between retracted and extended positions with respect to said mounting structure, and an elongated beam secured to and extending between said outer ends of said forward tubular member and said rearward tubular member of said first pull-out section;

said first pull-out extender assembly also including a second pull-out section including at least first and second tubular members, having inner and outer ends, with a beam secured to said outer ends of said at least first and second tubular members of said second pull-out section;

said inner ends of said at least first and second tubular members of said second pull-out section being slidably received by said outer ends of said intermediate support tubes so as to be selectively movable between retracted and extended positions with respect to said mounting structure;

and third and fourth pull-out sections, which are identical to said first and second pull-out sections respectively, operatively mounted on said second ends of said plurality of said support tubes;

said second pull-out extender assembly being spaced rearwardly of said first pull-out extender assembly and being identical to said first pull-out extender assembly.

6. An adjustable width trailer, comprising:
an elongated wheeled frame means having a forward end, a rearward end, a first side and a second side;
said frame means including horizontally spaced-apart first and second elongated frame members;
a plurality of horizontally spaced-apart cross-frame members secured to said first and second frame members which extend therebetween;
a plurality of pull-out extender assemblies secured to said frame means;
each of said pull-out extender assemblies including a mounting structure having a plurality of elongated support tubes, having first and second ends, secured to said first and second frame members in a transverse relationship thereto so that said first ends of said plurality of said support tubes are positioned laterally outwardly of said first frame member and so that said second ends of said plurality of said support tubes are positioned outwardly of said second frame member;
each of said pull-out extender assemblies including a first pull-out section having horizontally spaced-apart forward and rearward tubular members, having inner and outer ends, the inner ends of which are slidably received by the first ends of a pair of support tubes so as to be movable between retracted and extended positions with respect to said mounting structure, an elongated beam secured to and extending between said outer ends of said forward tubular member and said rearward tubular member of said first pull-out section;
each of said pull-out extender assemblies also including a second pull-out section including at least first and second horizontally spaced-apart tubular members, having inner and outer ends, with a beam secured to said outer ends of said at least first and second tubular members of said second pull-out section;
said second pull-out section being positioned between said first and second tubular members of said first pull-out section;
said inner ends of said at least first and second tubular members of said second pull-out section being slidably received by said outer ends of said support tubes so as to be selectively movable between retracted and extended positions with respect to said mounting structure;

and third and fourth pull-out sections, which are identical to said first and second pull-out sections respectively, mounted on said second ends of said support tubes.

\* \* \* \* \*